United States Patent [19]

Roche et al.

[11] 4,065,602

[45] Dec. 27, 1977

[54] WICK-AND-POOL ELECTRODES FOR ELECTROCHEMICAL CELL

[75] Inventors: Michael F. Roche, Downers Grove, Ill.; Suzan M. Faist, Norwood, N.J.; James G. Eberhart; Laurids E. Ross, both of Naperville, Ill.

[73] Assignee: The United States of America as represented by the United States Energy Research and Development Administration, Washington, D.C.

[21] Appl. No.: 780,722

[22] Filed: Mar. 24, 1977

[51] Int. Cl.² .......................................... H01M 10/39
[52] U.S. Cl. ........................................ 429/72; 429/103
[58] Field of Search ................. 429/103, 102, 101, 72, 429/80, 81, 68, 49, 199; 204/140

[56] References Cited

U.S. PATENT DOCUMENTS

| 3,925,098 | 12/1975 | Saunders et al. | 429/103 |
| 3,933,520 | 1/1976 | Gay et al. | 429/103 |
| 3,947,291 | 3/1976 | Yao et al. | 429/103 |

Primary Examiner—Anthony Skapars
Attorney, Agent, or Firm—Dean E. Carlson; Frank H. Jackson

[57] ABSTRACT

An electrode system includes a reservoir of liquid-metal reactant, and a wick extending from a submersed location within the reservoir into the molten electrolyte of an electrochemical cell structure. The wick is flooded with the liquid metal and thereby serves as one electrode within the cell. This electrode system has application in high-temperature batteries employing molten alkali metals or their alloys as active material within an electrode submersed within a molten salt electrolyte. It also can be used in electrochemical cells where the purification, separation or electrowinning of liquid metals is accomplished.

9 Claims, 4 Drawing Figures

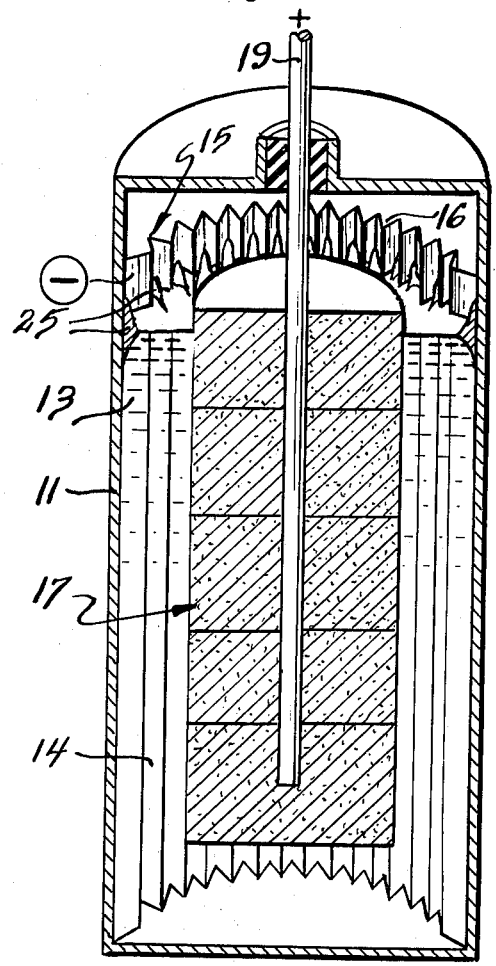
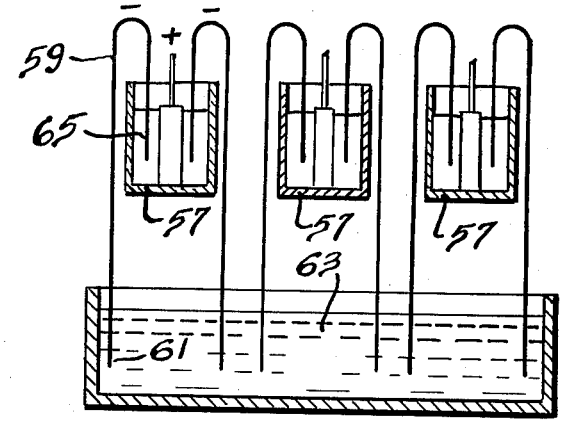
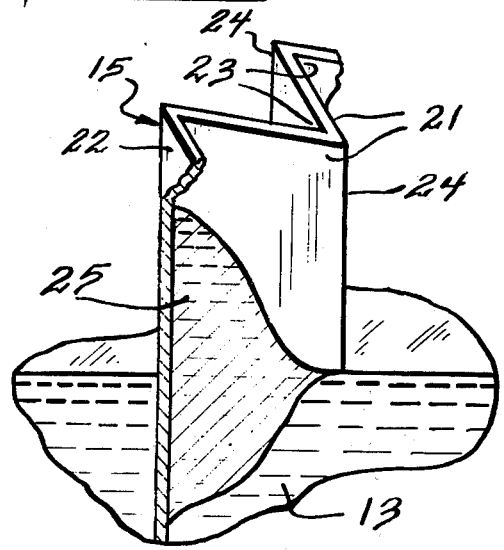
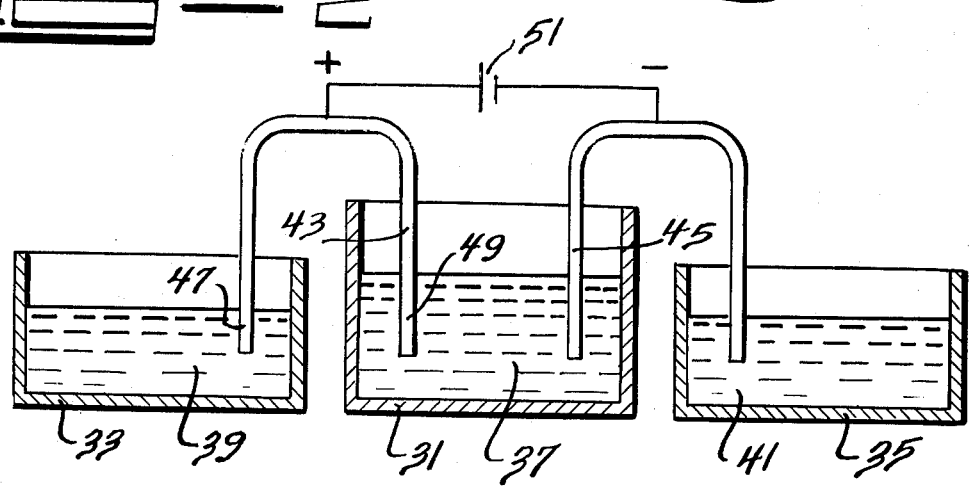

WICK-AND-POOL ELECTRODES FOR ELECTROCHEMICAL CELL

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to liquid-metal electrodes for use in electrochemical cells employed for energy storage or electrochemical separations. It has particular applicability to high-temperature, secondary electrochemical cells with electrodes that use the alkali metals such as lithium or sodium, alkaline earth metals such as calcium, or molten alloys of any of these metals as electrode reactants.

A large amount of work has been done in the development of these type electrochemical cells. Both molten and solid alkali metal and alkaline earth metal alloys are contemplated as negative electrode reactants. Positive electrodes in such cells often include as reactants the chalcogens or metal chalcogenides such as the sulfides of iron, nickel, cobalt or copper and mixtures of these materials. Examples of such secondary cells and their various components are illustrated in U.S. Pat. Nos. 3,933,521, Jan. 20, 1976, to Vissers et al.; 3,933,520, Jan. 20, 1976, to Gay et al.; 3,941,612, Mar. 2, 1976, to Steunenberg et al.; and 3,947,291, Mar. 30, 1976 to Yao et al.

Thus far, the most successful lithium electrodes have been those of the solid lithium alloys, particularly the intermetallic lithium-aluminum compounds. Although these solid lithium alloys are simple to fabricate and provide electrode stability, the lithium-aluminum alloys have higher equivalent weight and about 300 mV less anodic potential than elemental lithium metal. Thus, the use of lithium-aluminum alloys entails some sacrifice in energy and power.

Negative electrodes that employ molten elemental lithium as reactant have been constructed to retain the lithium within porous metal substrates such as metal felt, foam or compacted fibers submersed within molten electrolyte. Although wetting of solid metal substrates by liquid metal is improved somewhat by alloying lithium with for instance copper or zinc (U.S. Pat. No. 3,881,951) or by coating the substrate with a metal such as cobalt (U.S. Pat. No. 3,933,521), preferential wetting of the substrate by electrolyte often occurs upon repeated cycling of the electrode. Liquid metal droplets then form, that is dewetting by the liquid metal occurs, which may short circuit the cell.

Therefore, in view of the difficulties encountered in the use of liquid metal electrodes it is an object of the present invention to provide an improved electrode structure that employs molten metal as the electrode reactant.

It is a further object to minimize dewetting between the electrode substrate and the molten metal reactant during cell cycling.

It is also an object to minimize cell shorting from droplets or bridges of molten metal reactant between electrodes.

SUMMARY OF THE INVENTION

In accordance with the present invention a liquid-metal electrode system for use in a secondary electrochemical cell is provided. The system includes a cell structure containing a volume of liquid electrolyte and a reservoir of liquid metal disposed outside the volume of liquid electrolyte. A wick is positioned with a portion of its length submerged within the liquid metal of the reservoir and a second portion of its length submerged within the electrolyte of the cell structure. The wick is constructed of a material having sufficiently more capillary attraction and adhesion for the liquid metal than for the electrolyte to cause liquid metal to be drawn from the reservoir into the wick position submerged within the electrolyte.

In more specific embodiments of the invention the liquid metal is molten lithium or a molten lithium alloy with an additive metal such as copper. In addition, a preferred electrolyte includes a molten salt of alkali metal or alkaline earth metal halides having at least one fluoride salt. Preferred wicks include vertically pleated, stainless steel screens or sheets that retain the liquid metal in V-shaped grooves. The wicks extend above the electrolyte surface to provide a liquid-metal reservoir in their upper portions and in some embodiments extend to liquid-metal pools for additional reservoir capacity. In one other embodiment a plurality of wicks extend from a liquid-metal reservoir to feed the liquid metal reactant to a number of cells or to a multiple electrode cell.

A BRIEF DESCRIPTION OF THE DRAWINGS

The present invention is illustrated in the accompanying drawings wherein

FIG. 1 is a perspective view in cross section of an electrochemical cell similar to that used to test a liquid-metal-wick electrode.

FIG. 1a is a fragmentary and enlarged cross section taken at one of the pleat folds of the electrode wick shown in FIG. 1.

FIG. 2 is a schematic drawing of an electrochemical cell with separate liquid-metal reservoirs for each of the two electrodes.

FIG. 3 is a schematic view of an electrode system involving a plurality of wicks and cells.

DETAILED DESCRIPTION OF THE PREFERRED EMBODIMENT

In FIG. 1 an electrochemical cell is shown with a cell containment structure 11 containing a volume of molten electrolyte 13, a negative electrode 15 and a positive electrode 17.

The positive electrode 17 is of conventional type and may include such as a disk stack of compacted materials positioned in contact with a central conductor 19. Each of these compacts can include the electrode reactant, e.g. particulate metal sulfides, electrically conductive current collector material and electrolytic salt.

The negative electrode 15 is preferably a pleated metal sheet or screen, as shown. This pleated structure acts as a wick to supply liquid-metal-electrode reactant from its upper portion 16 into its lower portion 14 that is submerged within the electrolyte volume 13. The upper portion 16 of wick 15 above the electrolyte 13 surface is thus a reservoir for containing liquid metal. This type arrangement is more suitable for use in systems having a less dense liquid metal such as lithium relative to the electrolyte e.g. LiF—LiCl—KCl than with the more dense metals. Here the liquid metal tends to float on the electrolyte surface and is drawn by capillary attraction into the lower portion 16 of the wick below the electrolyte level as needed for cell operation.

FIG. 1a shows an enlarged cross-sectional portion of the pleated wick structure 15. The wick design includes a pleated or corrugated metal sheet 22 having V-shaped channels 23 between sides 21 that intersect at ridges 24. Liquid-metal 25 is shown contained in channels 23 both above and below the electrolyte 13 surface where it is held by capillary attraction against the force of gravity in the portion above the electrolyte level and against the buoyancy force of the electrolyte below its surface. The liquid-metal reactant can be retained on both the front side of the wick 15, as illustrated, and in the channels formed on the opposite surface of wick 15.

The electrochemical cell of FIGS. 1 and 1a is presented to illustrate one embodiment of applicants' novel electrode system. However, it will be clear that this electrode system can be employed in a large number of electrochemical cell configurations instead of that shown in FIG. 1. Parallel, rectilinear electrodes including one or more with the liquid-metal-wick described herein can also be employed. Such rectilinear, prismatic type cells lend themselves to multiple electrode arrangements with three or more electrodes of alternate polarity within each cell structure. Wick electrodes in these arrangements advantageously will have their major surfaces, including the ridges, and channels positioned to face the opposite electrodes.

The pleated, metal electrode structure of FIGS. 1 and 1a has been found to be a preferred wicking configuration. When used with molten lithium or lithium alloys, it advantageously is constructed of a chromium alloy steel such as one of the austenitic stainless steels. Such materials are commercially available as 304, 316 and 347 stainless steels. The wick can be constructed of smooth sheets, of screens or of other mesh. Somewhat improved liquid metal containment ability has been found through use of the screen or mesh structure.

The channels within the pleated electrode are formed with greater depth than width to enhance the wick's ability to contain a liquid metal. Depth-to-width ratios of about 4 have been found to be suitable. The channel depth is measured from its apex to its base or opening, and the width is measured between ridges 24.

Other wick electrode structures that have been tried with fair results include arrays of twisted wire on a plate substrate, wire rope twisted around a metal rod support, twisted, braided, looped or otherwise entangled wires within opened, tubular passageways.

In high temperature, high power electrochemical cells the alkali metals, such as lithium and sodium, are often selected as the negative electrode reactant. Other liquid metals, such as potassium, sodium potassium alloy, calcium, copper, aluminum, zinc, along with molten alloys of the liquid metals may also be chosen for use as electrode reactants. In the case of molten lithium, it is known that its wetting characteristics can be improved by the addition of molten metal additives, for instance, by the addition of copper or zinc. Copper at a level of about 10% weight percent in lithium has been found to enhance wetting characteristics of molten lithium on stainless steel wick structures.

The electrolyte selected for use with a molten alkali metal, such as lithium, as a negative electrode reactant, can be a molten electrolytic salt combination including alkali metal halides and alkaline earth metal halides. Merely by way of example a eutectic composition of LiCl — KCL is often employed. It has been found that molten salts that include alkali metal or alkaline earth metal fluorides, for example, LiCl — LiF, LiBr — LiF, LiI — LiF and LiCl — $CaCl_2$ — $Ca_2F$ — KBr can be advantageously used to further improve the wetting ability of the molten lithium. Also, other molten salt combinations in which lithium fluoride is included at levels not exceeding its solubility, may also be used for this purpose. However, at least about 2 wt % of such as LiF should be included to effectively promote wetting of stainless steel by molten lithium metal or alloy.

Although FIG. 1 illustrates liquid metal reservoir within the channels 23 of wick 15, other reservoir structure can also be employed. Additional liquid metal can float on the surface of the electrolyte confined between a retainer ring and the wick structure. Similarly an inverted metal cup or reservoir can retain the liquid metal on the electrolyte surface.

A separate reservoir for the liquid metal can also be used apart from the electrolyte containment. Transfer of the liquid metal from the reservoir to the appropriate cell electrode can be accomplished through a wicking structure with a portion of its length submerged in the liquid metal and a portion submerged within the cell electrolyte. Where the liquid metal is of lower density than the electrolyte, as in the case of many alkali metal-molten salt combinations, e.g. molten lithium and the alkali metal halides, the liquid metal reservoir is disposed with its surface at a lower elevation than the electrolyte surface. This will tend to transfer or siphon liquid metal droplets through the wick from the electrolyte surface to the reservoir. In instances where the liquid metals are more dense than the electrolyte, the wick or wicks can extend upward from the reservoir into the electrolyte. In this case, the electrolyte can be floated on the liquid metal surface within a retainer structure. Density adjustments to facilitate transfer of the liquid metal to a desired location can be accomplished by the addition of alloying elements such as sodium to lithium or bromine containing salts to electrolyte.

Referring now to FIG. 2 where the electrochemical cell 31 is shown supplied by two liquid metal reservoirs 33 and 35. The cell is shown containing a molten, salt electrolyte 37, and the reservoirs contain molten metal or molten metal alloys 39 and 41. Cell 31 is illustrated with two electrodes 43 and 45 that are part of an electrode wick structure. The wicks can be the pleated metal wicks illustrated in FIGS. 1 and 1a. A first portion 47 of the wick is submerged within the liquid metal while a second portion 49 is submerged within the molten electrolyte 37. As the liquid metal is depleted or accumulated during operation of the cell, it can be transferred as appropriate from reservoir to cell and from cell to reservoir.

The electrochemical cell illustrated in FIG. 2 is adapted for electrorefining of liquid metals. A source of electrical potential 51 is used to drive liquid metal from electrode 43 to electrode 45. Contaminated liquid metal in reservoir 33 can thereby be drawn through the electrode wick from submerged portion 47 in the reservoir to submerged portion 49 within the electrolyte and electrochemically transferred without its impurities to electrode 45. The wicking action of electrode 45 then transfers the clean liquid metal into the reservoir 35. A cell of the type illustrated in FIG. 2 can also be employed as a source of electrical potential merely by using dissimilar metals with substantial difference in oxidizing potentials in reservoirs 33 and 35 and by replacing source 51 with a load.

FIG. 3 illustrates one other manner of employing the wick-and-pool electrode system of the present invention. A plurality of electrochemical cells 57, each including two liquid metal wicks 59 as negative electrodes, are illustrated. Each of the wicks 59 includes a first end portion 61 submerged within a pool of liquid metal 63 and a second opposite end portion 65 submerged within the electrolyte of the electrochemical cell. Liquid metal 63 is thereby conducted through wicks 59 into wick portion 65 which serves as the negative electrodes within the illustrated cells. Such cells employing a common reservoir or pool of liquid metal would appropriately be parallel connected.

The following examples are presented in order to further illustrate the present invention.

EXAMPLE I

An electrochemical cell similar to that illustrated in FIG. 1 included a positive electrode of FeS as reactant and a negative electrode of molten lithium. The molten lithium was alloyed with about 10 weight percent copper and contained within a pleated metal wicking structure. The wick was constructed of three layers of screen including a central 40 U.S. sieve series mesh layer and two outer 325 mesh layers of 304 stainless steel. The pleated wick included channels of 0.6 cm depth, 0.15 cm width and about 12 cm submerged in electrolyte. Approximately 20% of the wicking structure was employed above the surface of the electrolyte level. The cell included a total of 86 amp hours of FeS, 110 amp hours Li — Cu and an electrolyte of LiCl — KCl with 2 weight % LiF. The cell was operated for 70 cycles at 25 amps hour average with 97% coulombic efficiency. The Li — Cu alloy was observed to store on both the front and back of the pleated screen.

EXAMPLE II

Another electrochemical cell similar in construction to that illustrated in FIG. 1 but with a porous, aluminum central electrode was operated as an Li/LiAl cell. The cell was operated for 30 cycles at 10 amp hours each (4 amp charge 2 amp discharge) with no sign of lithium dewetting or shorting.

EXAMPLE III (CELL WPA-1)

An electrochemical cell having a separate reservoir of lithium metal with about 10 weight % copper was tested. The liquid-lithium alloy was conducted from the reservoir through a metal wick into a wick portion submerged below the electrolyte level to serve as a negative electrode. The wick was constructed of about 300 loops of 0.013 cm, stainless steel wire passing through a 0.635 cm O.D. stainless steel pipe. Window openings through the pipe wall exposed additional portions of the wire beneath the electrolyte surface. This lithium electrode was operated opposite a conventional FeS positive electrode for about 3 cycles at 1.3 to 1.8 volts to illustrate its operability.

It will be clear that the present invention provides an improved electrode system for employing liquid metals as electrode reactants which will permit operation at increased electrical potentials. The development includes a wicking surface both for conveying the liquid metal in the electrochemical cell and as the electrode structure. A reservoir of the liquid metal maintains wetting of the electrode wick and provides additional liquid metal capacity during charge and discharge operations.

The embodiments of the invention in which an exclusive property or privilege is claimed are defined as follows:

1. A liquid-metal electrode system for providing electrode reactant into an electrode within an electrochemical cell also including a second electrode of opposite polarity, said system comprising a cell structure containing a volume of liquid electrolyte, a reservoir containing said liquid metal outside said volume of liquid electrolyte, a wick having a first portion of its length in contact with said liquid metal within said reservoir, and having a second portion of its length opposite to said first portion submerged within said volume of electrolyte, said wick having sufficiently more attraction for said liquid metal than for said electrolyte to draw said liquid metal into said second portion submerged within said electrolyte.

2. The electrode system of claim 1 wherein said liquid metal comprises liquid lithium or a molten lithium alloy.

3. The electrode system of claim 1 wherein said electrolyte includes an alkali metal or alkaline earth metal fluoride.

4. The electrode system of claim 1 wherein a plurality of wicks are submerged within a single reservoir of liquid metal at their first portions and each of said wicks extending to one of a number of cell structures within which their second portions are submerged in molten electrolyte to serve as electrodes.

5. The electrode system of claim 1 wherein said wick comprises a pleated metal structure having a portion submerged within said liquid electrolyte for use as an electrode within said electrochemical cell, said pleated structure includes a V-shaped channel containing liquid metal for use as an electrode reactant.

6. The electrode system of claim 5 wherein said V-shaped channel has greater depth than width.

7. The electrode system of claim 6 wherein said V-shaped channels have a depth to width ratio of about 4.

8. The electrode system of claim 5 wherein said pleated metal structure comprises a plurality of screen layers of chromium alloy steel.

9. The electrode system of claim 1 wherein said wick is formed into an inverted U-shape having two side portions, the first of said side portions being submersed in said liquid metal and the second in said liquid electrolyte.

* * * * *